United States Patent [19]

Leroux

[11] 4,218,847
[45] Aug. 26, 1980

[54] HYDROPONIC APPARATUS
[75] Inventor: Frank W. Leroux, Seminole, Fla.
[73] Assignee: I-OAG, Inc., Largo, Fla.
[21] Appl. No.: 954,413
[22] Filed: Oct. 25, 1978
[51] Int. Cl.³ ............................................. A01G 31/02
[52] U.S. Cl. .......................................... 47/59; 47/82; 47/62
[58] Field of Search .................................... 47/81–82, 47/83, 79–80, 59–65

[56] References Cited

U.S. PATENT DOCUMENTS

| 1,217,239 | 2/1917 | Swartz | 47/82 X |
| 3,841,023 | 10/1974 | Carlyon | 47/82 X |
| 4,059,922 | 11/1977 | DiGiacinto | 47/82 |
| 4,075,785 | 2/1978 | Jones | 47/64 |
| 4,161,085 | 7/1979 | Moffett | 47/82 |

FOREIGN PATENT DOCUMENTS

| 1528482 | 4/1968 | France | 47/83 |
| 1486553 | 9/1977 | United Kingdom | 47/82 |

*Primary Examiner*—Robert E. Bagwill
*Attorney, Agent, or Firm*—Arthur W. Fisher, III

[57] ABSTRACT

A hydroponic apparatus comprising a free standing base housing a nutrient feed supply and a plurality of mutually supporting plant trays extending diagonally upward from the free standing base wherein each plant tray includes a plurality of plant supports having nutrient feed apertures formed therein such that each plant is fed directly from the nutrient feed supply.

8 Claims, 5 Drawing Figures

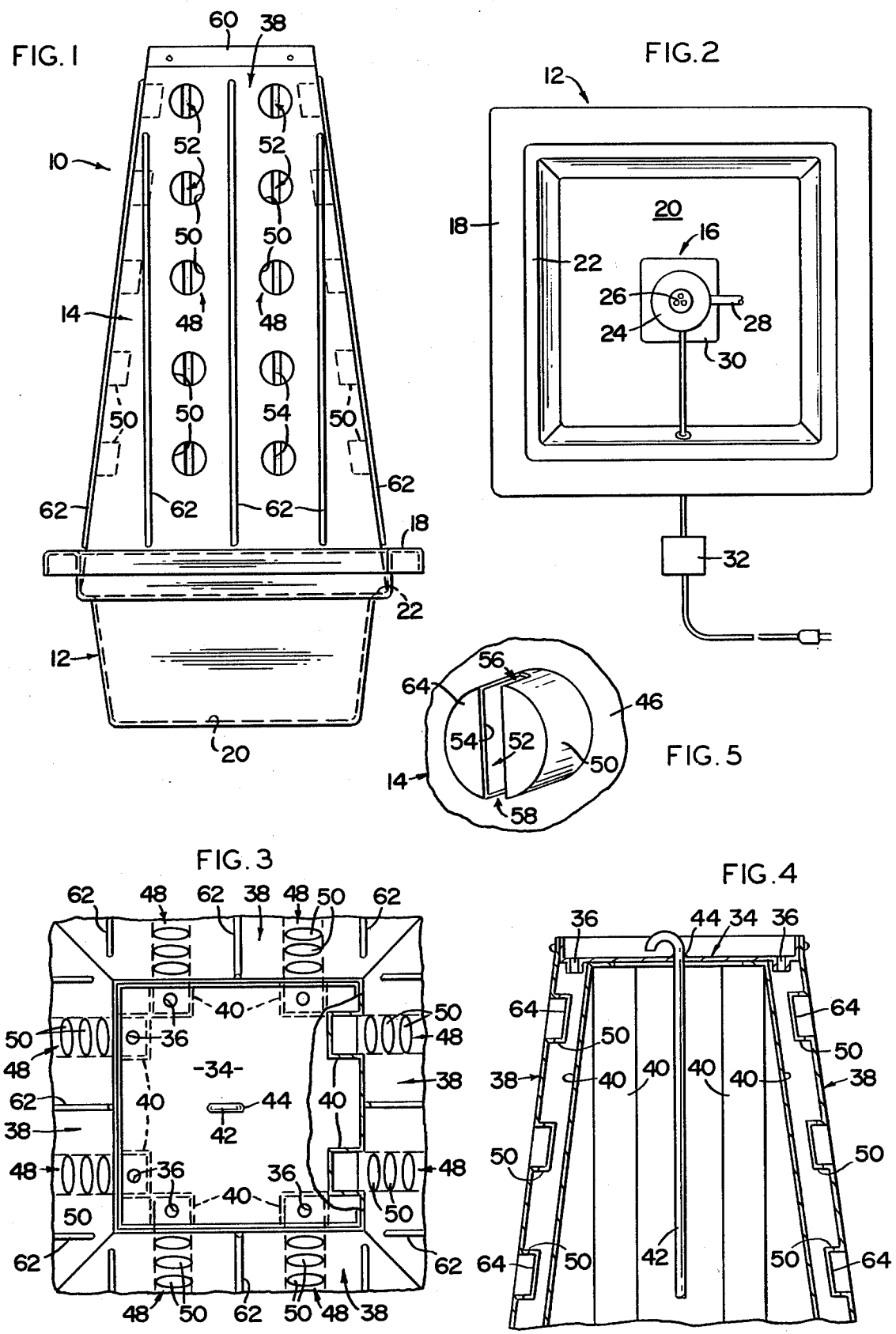

HYDROPONIC APPARATUS

BACKGROUND OF THE INVENTION

1. Field of the Invention

A hydroponic apparatus specifically configured to feed a plurality of plants supported thereon directly from a nutrient feed supply.

2. Description of the Prior Art

The prior art discloses a number of hydroponic devices. For example, U.S. Pat. No. 3,667,158 shows a combined humidifier and plant apparatus including a first compartment, water trough being provided in the first compartment and a tray arranged to cover the water trough and for supporting a layer of soil above the trough. A second compartment is provided to receive a quantity of water. An immersion heater is located in the second compartment. A fan is positioned so as to drive air and water vapor across the surface of the water in the second compartment humidify the ambient atmosphere.

U.S. Pat. No. 3,451,162 illustrates a hydroponic apparatus including a housing means for forming a nutrient solution storage chamber. Pump means provided in the housing to pump the nutrient solution from the storage chamber to a supporting means holding the roots of the plants positioned within the housing means. Radiation means may also be provided in the housing means.

Additional examples of the prior art are found in U.S. Pat. Nos. 119,242; 800,746; 841,306; 1,245,441; 2,121,461; 2,198,150; 2,296,860; 2,306,027; 2,431,890; 2,592,476; 2,777,253; 2,854,792; 2,855,725; 2,963,819; 3,095,670; 3,323,253; 3,532,437; 3,768,201; 3,841,023; 3,861,519; 3,992,809; 4,014,135; 4,051,626; 3,059,922; 4,075,785;. Also of interest is French Pat. Nos. 857,501, 1,170,246 and 1,400,547 together with British Pat. No. 4,469.

SUMMARY OF THE INVENTION

The present invention relates to a hydroponic apparatus. More specifically, the hydroponic apparatus comprises a free standing base, a nutrient feed supply disposed in the free standing base and a plurality of mutually supporting plant trays extending diagonally upward from the free standing base.

The free standing base comprises a substantially rectangular lower tray forming a nutrient compartment having a horizontally disposed support ledge formed about the upper periphery thereof. The nutrient feed supply is operatively housed within the free standing base. More particularly, the nutrient feed supply comprises a pump disposed within the nutrient compartment to feed nutrient therefrom to plants supported on the plurality of plant trays. A spray nozzle may be coupled to the pump to spray a mist directly to the plants on the plurality of supporting plant trays. Alternately, a plurality of nutrient feed panels including nutrient feed channels corresponding to each of the plant trays may be provided to supply the nutrient to the plants.

The plurality of mutually supporting plant trays each, comprises a flat surface or panel having a plurality of plant supports formed thereon. Each plant support includes a nutrient feed aperture formed therein to permit the nutrient to be fed to the plants.

In use each plant is rooted in an inert material and placed into the interior of the plant supports. In operation nutrient is fed from the nutrient compartment by the pump actuated either manually or through a timer coupled to an external electrical source. As the nutrient is fed to the plant trays, the nutrient is fed through the material to the roots of the plants within the material. Due to the diagonal slant of the plant trays, the nutrient is returned to the nutrient compartment.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of a hydroponic system.

FIG. 2 is a top view of a free standing reinforced base.

FIG. 3 is a top view of an alternate hydroponic system.

FIG. 4 is a partial side view of the alternate hydroponic system.

FIG. 5 is a detailed perspective view of the plant support.

Similar reference characters refer to similar parts throughout the several views of the drawings.

DETAILED DESCRIPTION OF THE PREFERRED EMBODIMENT

As shown in FIGS. 1 and 2, the present invention comprises a hydroponic apparatus generally indicated as 10 specifically configured to provide a closed, self-sustaining system. The hydroponic apparatus 10 comprises a support means or a free standing base generally indicated as 12, a plurality of mutually supporting plant trays each indicated as 14 extending diagonally upwardly from the base 12 and a nutrient feed supply generally indicated as 16.

As best shown in FIG. 2, the free standing base 12 comprises a substantially rectangular lower tray 18 forming a nutrient compartment 20 having a substantially horizontal support ledge 22 formed about the upper periphery thereof. The nutrient feed supply 16 is operatively housed within the free standing base 12. More particularly, the nutrient feed supply comprises a pump 24 disposed within the nutrient compartment 20 to feed nutrient therefrom to the plant trays 14 by at least one spray nozzle 26. The nutrient is fed to the pump 24 by feed conduit 28. The pump 24 may be supported by a pedestal 30 in base 12. The pump 24 may be actuated manually or automatically through a timer 32 coupled to an electrical source (not shown). FIGS. 3 and 4 show an alternate nutrient feed supply comprising a nutrient feed supply manifold 34 having a plurality of nutrient feed supply aperture 36 formed on the periphery thereof in combination with a plurality of nutrient feed supply panels 38 corresponding to each plant tray 14 and substantially parallel therewith. Each nutrient feed supply panel 38 includes a pair of nutrient feed supply channels 40 in open register with corresponding nutrient feed supply apertures 36. The nutrient feed supply manifold 34 is coupled to the pump 24 by a substantially vertical nutrient feed supply pipe 42 extending through manifold aperture 44.

As best shown in FIGS. 1 and 5, the plant trays 14 comprise a panel 46 having at least two rows of plant supports each generally indicated as 48. Each plant support 48 comprises a substantially cylindrical recess 50 having a nutrient feed aperture 52 formed in the base and sides thereof. Specifically each nutrient feed aperture 52 comprises an elongated slot portion 54 and an upper and lower peripheral slot portions 56 and 58 respectively. The upper portion of the plant trays 14 are enclosed by an upper horizontal panel 60. Further the plant trays 14 may include reinforcing ribs 62 as best shown in FIG. 1. The rear wall 64 of recess 50 is substantially parallel to panel 46.

In use plants or seedlings are placed in an inert material and positioned individually within the plant supports 48. The inert material is preferably a fiberous, porous matter such as nylon or other synthetic fiber. Of course, a natural sponge or the like may be used. In operation nutrient is fed from the nutrient compartment 20 by the pump 24 actuated either manually or through the timer 32 coupled to an external electrical source (not shown) through nutrient feed apertures 52 and more particularly slot portion 54 and upper slot portion 56. Due to the slant of the diagonal plant tray 14, the nutrient is returned through the lower slot portions 58 to the nutrient compartment 20 for recirculation. As shown in FIGS. 1 and 2, the nutrient is fed directly to the plants through the feed apertures 52 by spray nozzle(s) 26.

As shown, the plant trays 14 may be removed with ease to permit planting, transportation and harvesting in the horizontal plane.

In the alternate embodiment of FIGS. 3 and 4 nutrient is fed to the nutrient feed supply manifold 34 through nutrient feed supply pipe 42 where it is gavity fed through manifold apertures 44 to nutrient feed supply channels 40. Since the panels 38 are substantially parallel to the plant trays 14, the supply channels 40 are in surrounding relation relative to the recesses 50 such that the nutrient is fed through base portions 54 and upper slot portion 56 of the plants.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A hydroponic apparatus comprising a support means having a plurality of mutually supporting diagonally disposed plant trays supported thereon and a nutrient feed supply disposed within said plurality of plant trays, each said plant tray includes a plurality of plant supports having nutrient feed apertures formed therein such that each plant is fed directly from said nutrient feed supply, said nutrient feed supply comprises a pump disposed within said plurality of plant trays and a nutrient feed supply manifold having a plurality of nutrient supply apertures formed thereof in combination with a plurality of nutrient feed supply panels corresponding to each of said plant trays wherein said corresponding nutrient feed supply panels and said plant trays are arranged relative to each other to feed nutrient to the base of said plant supports.

2. The hydroponic apparatus of claim 1 wherein each said plant support comprises a recess formed in said plant trays, said nutrient feed apertures being formed in the lower portion of said recess.

3. The hydroponic apparatus of claim 2 wherein the rear wall of said recess is substantially parallel to the face of said plant tray.

4. The hydroponic apparatus of claim 2 wherein each said feed aperture comprises an elongated base portion and an upper and lower side portion such that nutrient is fed from said nutrient compartment to plants disposed within each said plant support through said elongated base portion and said upper side portion and returned to said nutrient compartment through said lower side portion.

5. The hydroponic apparatus of claim 4 wherein said recess is substantially cylindrical.

6. The hydroponic apparatus of claim 1 wherein each said nutrient feed supply panel includes at least one nutrient feed supply channel in open registry with a corresponding nutrient feed supply aperture to receive nutrient from said nutrient feed supply manifold.

7. The hydroponic apparatus of claim 6 wherein said corresponding nutrient feed supply panels and said plant trays are substantially parallel relative to each other and corresponding said nutrient feed supply channels are immediately adjacent the base of said corresponding plant supports.

8. The hydroponic apparatus of claim 1 wherein said support means comprises a free standing base including a nutrient compartment formed therein.

* * * * *